(12) United States Patent
Butcka

(10) Patent No.: US 10,724,811 B2
(45) Date of Patent: Jul. 28, 2020

(54) THERMAL WAX BYPASS VALVE UTILIZING BOOT WITH WAX SEPARATORS

(71) Applicant: Hamilton Sundstrand Corporation, Charlotte, NC (US)

(72) Inventor: William W. Butcka, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 35 days.

(21) Appl. No.: 16/207,430

(22) Filed: Dec. 3, 2018

(65) Prior Publication Data

US 2020/0173742 A1    Jun. 4, 2020

(51) Int. Cl.
G05D 23/02 (2006.01)
F28F 27/02 (2006.01)
F16K 11/07 (2006.01)
F28D 21/00 (2006.01)

(52) U.S. Cl.
CPC .......... *F28F 27/02* (2013.01); *F16K 11/0716* (2013.01); *F28D 2021/0089* (2013.01); *F28F 2250/06* (2013.01)

(58) Field of Classification Search
CPC ... F28F 27/02; F28F 2250/06; F16K 11/0716; F28D 2021/0089; G05D 23/1333
See application file for complete search history.

(56) References Cited

U.S. PATENT DOCUMENTS

| 2,873,633 | A | 2/1959 | May |
| 3,064,477 | A | 11/1962 | Vernet |
| 2006/0108435 | A1* | 5/2006 | Kozdras ............. G05D 23/1333 236/93 R |
| 2008/0223316 | A1 | 9/2008 | Banta et al. |
| 2010/0126598 | A1* | 5/2010 | Peric ..................... G05D 23/022 137/468 |
| 2014/0116648 | A1* | 5/2014 | Cho ........................ F28D 9/005 165/96 |
| 2018/0038502 | A1* | 2/2018 | Tallos ................... F16K 31/002 |

FOREIGN PATENT DOCUMENTS

| FR | 1537879 | 8/1968 |
| GB | 1240689 | 7/1971 |

OTHER PUBLICATIONS

European Search Report for EP Application No. 19208630.4 dated Apr. 20, 2020.

\* cited by examiner

*Primary Examiner* — P. Macade Nichols
(74) *Attorney, Agent, or Firm* — Carlson, Gaskey & Olds, P.C.

(57) ABSTRACT

A bypass system has a source of a fluid to be cooled and a heat exchanger for selectively cooling fluid. A piston is moveable along an axis allowing movement of a valve poppet toward and away from the valve seat. The piston contacts a boot. A wax element is disposed in a chamber, such that the wax element expands as a temperature of the fluid to be cooled increases, and causes the valve poppet to move against the valve seat. The boot has wax separator structures. A bypass valve is also disclosed.

20 Claims, 3 Drawing Sheets

THERMAL WAX BYPASS VALVE UTILIZING BOOT WITH WAX SEPARATORS

BACKGROUND

This application relates to a seal that has a thermally responsive wax plug and a boot.

Valves are utilized in any number of modern fluid flow applications. One valve application controls a bypass on a line connecting a fluid to a heat exchanger. If the fluid is below a predetermined temperature, it may be inefficient to send the fluid to the heat exchanger. In such instances, the valve opens to bypass the fluid back to a sump or other source.

One type of valve for providing the selective bypass based upon the temperature of the fluid utilizes a wax element that expands when heated. When the wax is heated, it drives a valve against the seat and when the wax cools, it allows a spring assembly to move the valve to a bypass position.

In the existing valves, a rubber boot seals the wax within a portion of a chamber.

SUMMARY

A bypass system has a source of a fluid to be cooled and a heat exchanger for selectively cooling fluid. A bypass valve is mounted on a line to selectively bypass fluid prior to reaching the heat exchanger. The bypass valve includes a valve poppet and valve seat. The valve further includes a piston moveable along an axis, allowing movement of the valve poppet toward and away from the valve seat. The piston contacts a boot. The boot and the piston move within a valve housing. The valve housing has a chamber formed on one axial side of the boot. A wax element is disposed in the chamber, such that the wax element expands as a temperature of the fluid to be cooled increases, and causes the valve poppet to move against the valve seat. The wax element cools if the temperature of the fluid to be cooled lowers such that the valve poppet can move away from the valve seat. The boot has wax separator structures.

A bypass valve is also disclosed.

These and other features may be best understood from the following drawings and specification.

DETAILED DESCRIPTION

Figure 1:
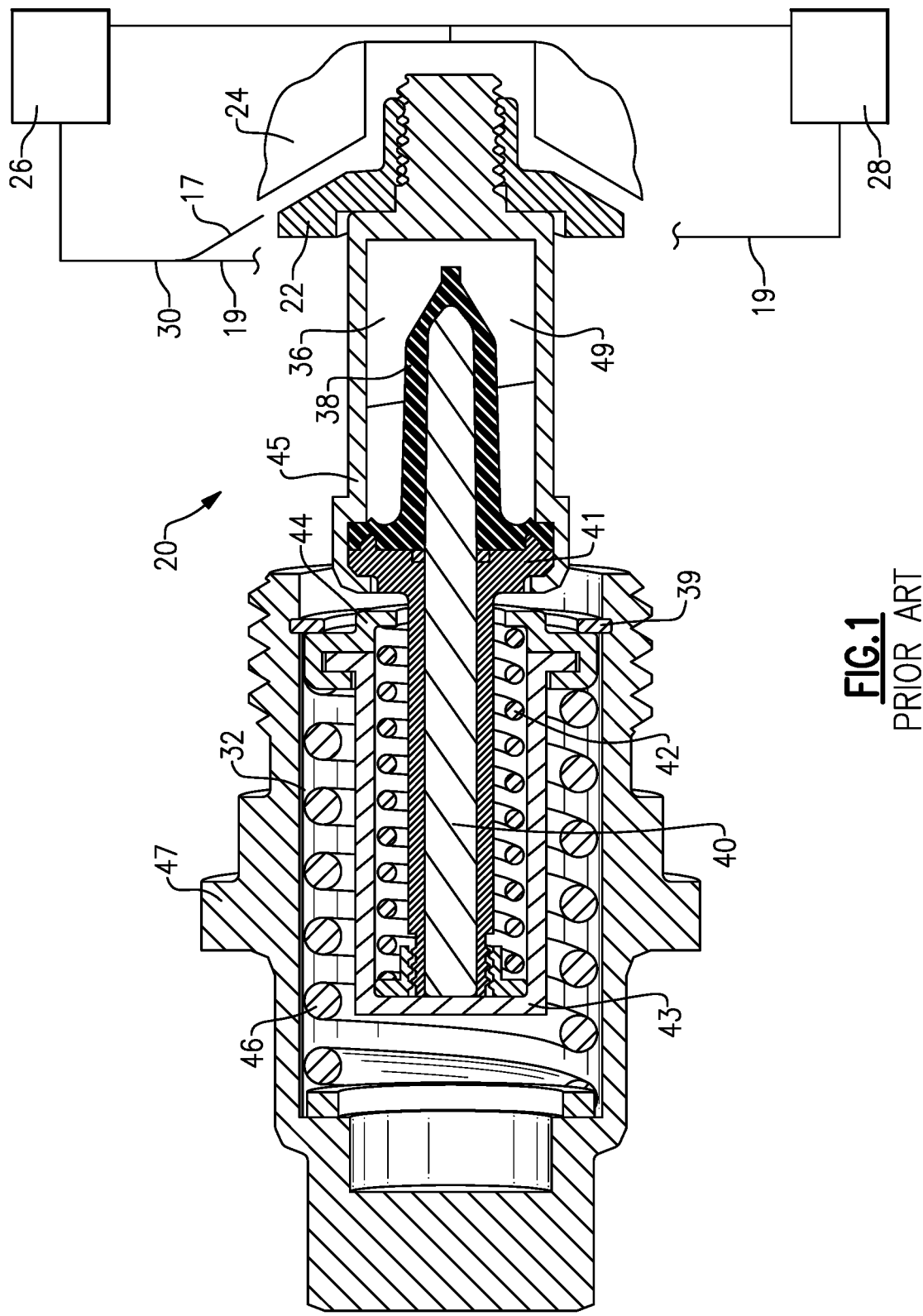
FIG. 1 shows an existing valve.

FIG. 1 shows a valve assembly 20 in a bypass system. A valve poppet 22 is selectively driven to seat on a valve seat 24. A source 26 selectively communicates a fluid to be cooled to a heat exchanger 28. When the valve poppet 22 is not seated on the seat 24, this fluid is allowed to bypass the heat exchanger 128 and return through line 17 to the source 26.

As shown, the bypass fluid in line 17 communicates with the line 19 which is the normal return line from the heat exchanger 28. These two flows combine into a line 30 heading back to the source 26. The source 26 could be a sump and an item that the oil is cooling such as a generator or other system.

Of course, this explanation is greatly simplified. One such fluid may be oil utilized to cool other components in a gas turbine engine although other bypass applications will benefit from this disclosure. It is only under certain conditions that the oil will reach a temperature where the cooling is necessary. It may be inefficient to cool the fluid at times when it is below a predetermined temperature. Thus, the bypass mode improves the efficiency by bypassing the heat exchanger under most operational conditions.

A valve piston 40 is received within a chamber in a valve housing 45. The valve housing is fixed with the valve poppet. Wax 36 is included in a chamber 49 between the housing 45 and the piston 40, and a rubber boot 38 maintains the wax in the chamber. If the fluid passing towards the heat exchanger 28 exceeds a predetermined temperature, it will heat the valve housing 45 and thus the wax 36. The wax 36 will then expand forcing the piston 40 to the left in the Figure. The piston 40 is received within a piston guide 43. The piston 40 has a forward face 41 secured to the boot 38. The valve guide 43 has a forward face 44. A return spring 42 is in the valve guide 43. Another spring 46 is outward of the valve guide 43 and within an outer housing 47 and provides a pressure relief function. The housing 43 applies a force against the snap ring 39. As the piston 40 moves to the left with the wax 36 being heated, it eventually bottoms out on the bottom of the chamber in the valve guide 43, and forces the valve housing 45 and poppet 22 to the right from the FIG. 1 position.

The wax plug or element 36 may be a wax and copper powder combination. The inclusion of the copper assists in heat transfer and the melting of the wax to achieve the fine control of the position of the valve 22.

The rubber boot 38 seals the wax element 36 from the remainder of a chamber 39. As can be appreciated, it is desirable to maintain the wax element 36 in a position forward of the piston 34. When the wax heats, it becomes fluid. If the rubber boot 38 tears, the wax can leak from the chamber 49 adversely affecting the efficiency and speed of operation of the valve 20.

Applicant has recognized that the wax 36 may migrate within the chamber 49 in such a manner that it is no longer uniformly distributed. Then, as it reheats, it can cause distinct forces on the piston 40, and the movement may not be directly axial. This would be undesirable.

Figure 2:
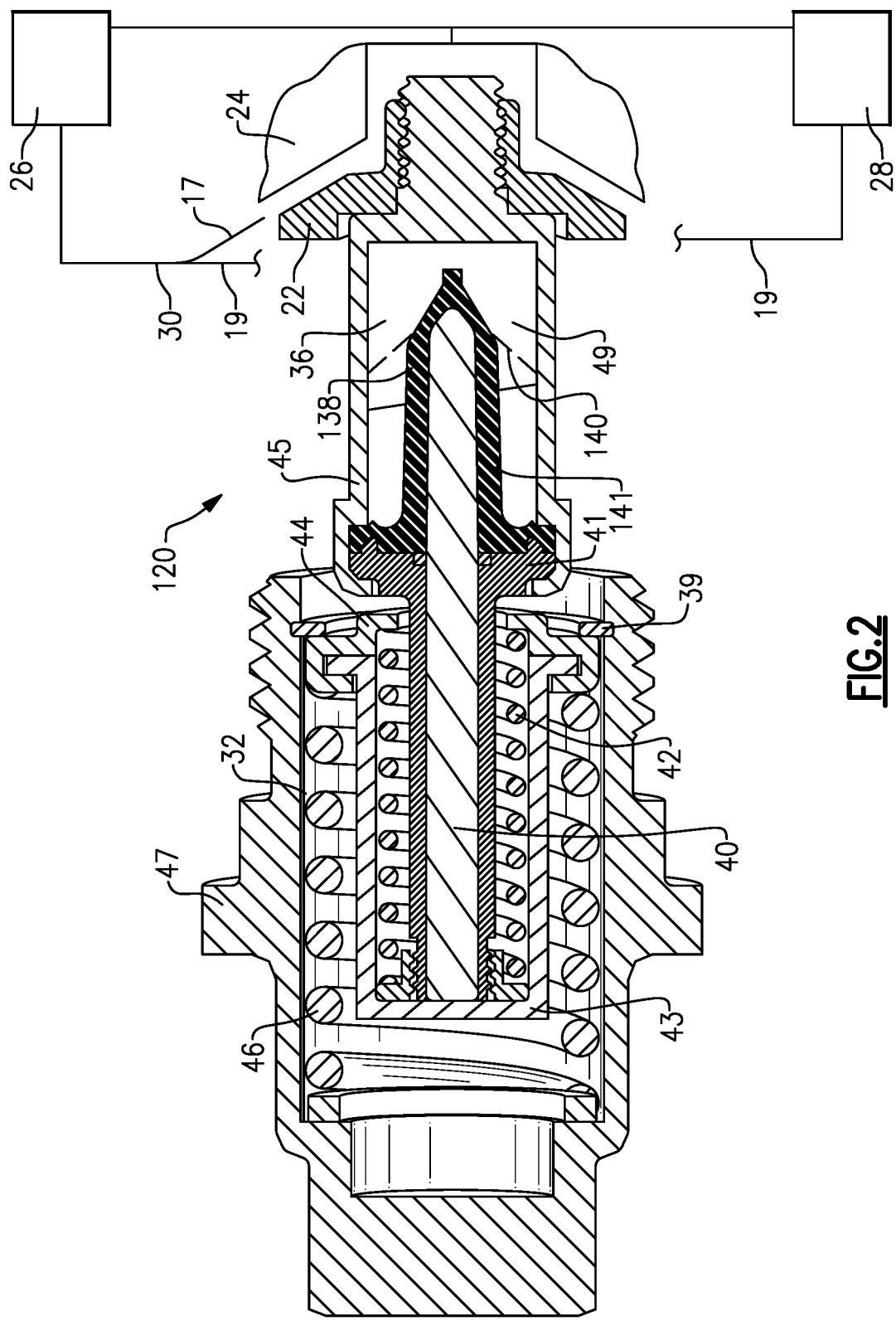
FIG. 2 shows an improvement to the existing valve.

FIG. 2 shows an alternative valve embodiment 120. In embodiment 120, the rubber boot 138 is provided with wax separator members 140. These members serve to circumferentially separate the wax such that it will be less likely to migrate to locations such that it will be drastically unevenly distributed. The wax separator members 140 also serve as strengthening ribs, reducing the likelihood the boot will tear.

Figure 3A:
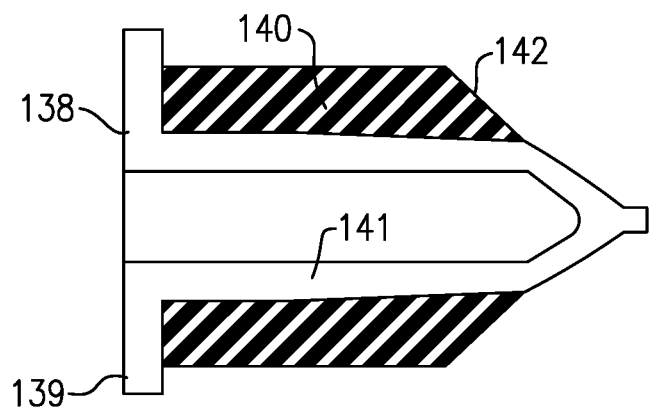
FIG. 3A shows a boot for the FIG. 2 valve.

As shown in FIG. 3A, there are a plurality of wax separator members 140 having an angled forward surface 142 extending away from a rear plate 139 of the rubber boot 138.

Figure 3B:
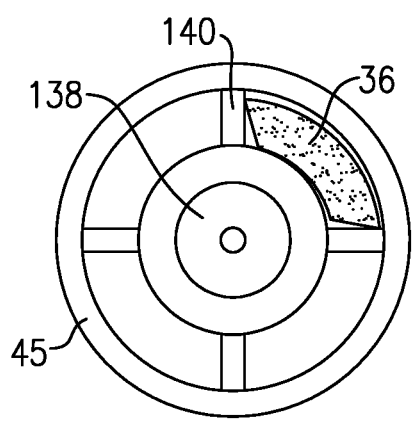
FIG. 3B shows a front view of the FIG. 3A boot.

FIG. 3B shows that there may be four of the wax separator members, which are circumferentially equally spaced, and which separate the wax 36 into distinct portions of the overall chamber 39.

As can be seen there are a plurality of wax separator structures 140 which are spaced circumferentially equally about a central axis of movement of said piston. It could be said the wax separator structures 140 extending radially outwardly of a central tubular portion 141 of the rubber boot 138. A plate 139 is at a rear point of central tubular portion 141. The wax separator structures 140 extend in a forward direction away from plate 139, and towards the valve seat 24, up to angled forward ends 142.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A bypass system comprising:
   a source of a fluid to be cooled and a heat exchanger for selectively cooling the fluid;
   a bypass valve mounted on a line to selectively bypass fluid prior to reaching the heat exchanger if the fluid falls below a predetermined temperature, said bypass valve including a valve poppet and valve seat, said valve further including a piston moveable along an axis allowing movement of said valve poppet toward and away from said valve seat, said piston contacting a boot, said boot and said piston movable within a valve housing, said valve housing having a chamber formed on one axial side of said boot, and a wax portion disposed in said chamber, such that said wax portion expands as a temperature of the fluid to be cooled increases, and causes said valve poppet to move against said valve seat and said wax cools if the temperature of the fluid to be cooled lowers such that said valve poppet can move away from said valve seat; and
   the boot having wax separator structures.

2. The bypass system as set forth in claim 1, wherein said wax portion includes a wax and a powdered metal.

3. The bypass system as set forth in claim 2, wherein said piston is forced in a first axial direction away from said valve seat as said wax expands, and causes said valve housing to move with said valve head toward said valve seat.

4. The bypass system as set forth in claim 3, wherein said wax separator structures include a plurality of wax separator structures which are spaced circumferentially equally about a central axis of movement of said piston.

5. The bypass system as set forth in claim 4, wherein there are at least four of said wax separator structures.

6. The bypass system as set forth in claim 5, wherein said wax separator structures extend radially outwardly away from a central tubular portion of the rubber boot.

7. The bypass system as set forth in claim 6, wherein the rubber boot has a plate extending radially outwardly beyond the radially outermost end of the wax separator structures.

8. The bypass system as set forth in claim 7, wherein said wax separator structures extend from said plate in a forward direction toward the valve seat, and have an angled forward end surface.

9. The bypass system as set forth in claim 1, wherein said piston is forced in a first axial direction away from said valve seat as said wax expands, and causes said valve housing to move with said valve head toward said valve seat.

10. The bypass system as set forth in claim 1, wherein said wax separator structures include a plurality of wax separator structures which are spaced circumferentially equally about a central axis of movement of said piston.

11. The bypass system as set forth in claim 10, wherein there are at least four of said wax separator structures.

12. The bypass system as set forth in claim 10, wherein said wax separator structures extend radially outwardly away from a central tubular portion of the rubber boot.

13. The bypass system as set forth in claim 12, wherein the rubber boot has a plate extending radially outwardly beyond the radially outermost end of the wax separator structures.

14. The bypass system as set forth in claim 13, wherein said wax separator structures extend from said plate in a forward direction toward the valve seat, and have an angled forward end surface.

15. A bypass valve comprising:
   a valve poppet and valve seat, and a piston moveable along an axis allowing movement of said valve poppet toward and away from said valve seat, said piston contacts a boot, and said boot and said piston moving within a valve housing, said valve housing having a chamber formed on one axial side of said boot, and a wax portion disposed in said chamber, such that said wax portion expands as a temperature of the fluid to be cooled increases, and causes said valve poppet to move against said valve seat and said wax cools if the temperature of the fluid to be cooled lowers such that said valve poppet can move away from said valve seat; and
   the boot having wax separator structures.

16. The bypass system as set forth in claim 15, wherein said wax separator structures include a plurality of wax separator structures which are spaced circumferentially equally about a central axis of movement of said piston.

17. The bypass system as set forth in claim 16, wherein there are at least four of said wax separator structures.

18. The bypass system as set forth in claim 16, wherein said wax separator structures extend radially outwardly away from a central tubular portion of the rubber boot.

19. The bypass system as set forth in claim 18, wherein the rubber boot has a plate extending radially outwardly beyond the radially outermost end of the wax separator structures.

20. The bypass system as set forth in claim 19, wherein said wax separator structures extend from said plate in a forward direction toward the valve seat, and have an angled forward end surface.

* * * * *